(12) United States Patent
Smith (10) Patent No.: US 7,140,965 B2
(45) Date of Patent: Nov. 28, 2006

(54) LUBRICATION SYSTEM FOR A UNIVERSAL JOINT CROSS

(75) Inventor: Johnny N. Smith, Toledo, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 175 days.

(21) Appl. No.: 10/886,108

(22) Filed: Jul. 7, 2004

(65) Prior Publication Data

US 2006/0009293 A1 Jan. 12, 2006

(51) Int. Cl.
*F16D 3/40* (2006.01)
(52) U.S. Cl. .................................................. 464/14
(58) Field of Classification Search ............ 464/11–14, 464/136
See application file for complete search history.

(56) References Cited

U.S. PATENT DOCUMENTS

| | | | |
|---|---|---|---|
| 1,346,776 A | 7/1920 | Washburn | |
| 1,889,470 A | 11/1932 | Garrett | |
| 2,859,598 A | 11/1958 | Hochreuter | |
| 2,903,868 A | 9/1959 | Stillwagon, Jr. | |
| 3,070,980 A | 1/1963 | Slaught | |
| 3,470,711 A | 10/1969 | Kayser | |
| 3,785,460 A | 1/1974 | Smith et al. | |
| 3,832,865 A | 9/1974 | Lewis | |
| 4,207,757 A | 6/1980 | Onuma | |
| RE30,790 E | 11/1981 | Lewis | |
| 4,478,591 A | 10/1984 | Mangiavacchi | |
| 4,781,652 A * | 11/1988 | Geisthoff | 464/14 |
| 4,781,662 A | 11/1988 | Mayhew et al. | |
| 4,795,401 A | 1/1989 | Ende | |
| 5,188,564 A | 2/1993 | Keller | |
| 5,263,552 A | 11/1993 | Cline et al. | |
| 5,389,039 A | 2/1995 | Mazziotti | |
| 5,695,405 A | 12/1997 | Kono | |
| 6,371,649 B1 | 4/2002 | Kawawada et al. | |
| 6,386,982 B1 | 5/2002 | Gille | |
| 6,881,151 B1 * | 4/2005 | Jantz et al. | 464/14 |
| 2002/0077183 A1 | 6/2002 | Sekine | |

FOREIGN PATENT DOCUMENTS

| | | | | |
|---|---|---|---|---|
| JP | 62-278317 | * | 12/1987 | 464/14 |
| SU | 211965 | * | 2/1968 | 464/14 |

* cited by examiner

*Primary Examiner*—Greg Binda
(74) *Attorney, Agent, or Firm*—MacMillan, Sobanski & Todd, LLC (57) ABSTRACT

A cross for use in a universal joint includes a lubrication system for positively causing lubricant to flow into the region of the bearings contained within a bearing cup mounted on the trunnion. The lubrication system includes a pump that is disposed in the lubrication passageway formed in the trunnion of the cross. In a first embodiment, the pump is embodied as a reciprocating piston pump, including a hollow cylindrical housing having a piston slidably supported therein. When the cross is rotated during use, the piston is moved radially outwardly relative to the housing, thereby injecting a quantity of lubricant from the lubricant passageway into the region of the bearings. When the cross is ceased to be rotated, the piston is moved radially outwardly relative to the housing under the urging of a spring. In a second embodiment, the pump is embodied as a rotatable auger pump. When the bearing cup rotates back and forth relative to the trunnion during use, the auger is rotated relative to the housing, thereby causing lubricant to be pumped from the lubricant passageway into the region of the bearings.

18 Claims, 6 Drawing Sheets

LUBRICATION SYSTEM FOR A UNIVERSAL JOINT CROSS

BACKGROUND OF THE INVENTION

This invention relates in general to universal joints, such as are commonly used in vehicular drive train systems. In particular, this invention relates to an improved structure for a cross for use in such a universal joint that includes a lubrication system for positively causing lubricant to flow from a central cavity through a lubrication passageway formed in a trunnion of the cross and into a region where bearings are contained within a bearing cup mounted on the trunnion.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Each of the universal joints typically includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or other friction-reducing structures are provided between the outer cylindrical surfaces of the trunnions and the inner cylindrical surfaces of the bearing cups to permit rotational movement of the bearing cups relative to the trunnions during operation of the universal joint. In the front universal joint of the above-described driveshaft assembly, the bearing cups supported on the first opposed pair of the trunnions on a front cross are connected to the front end fitting of the driveshaft assembly, while the bearing cups supported on the second opposed pair of the trunnions on the front cross are connected to an end fitting secured to the output shaft of the engine/transmission assembly. Similarly, in the rear universal joint of the above-described driveshaft assembly, the bearing cups supported on the first opposed pair of the trunnions on a rear cross are connected to the rear end fitting of the driveshaft assembly, while the bearing cups supported on the second opposed pair of the trunnions on the rear cross are connected to an end fitting secured to the input shaft of the axle assembly.

In order to insure proper operation of the universal joint, lubricant is usually provided in the regions where the bearings are provided between the outer cylindrical surfaces of the trunnions and the inner cylindrical surfaces of the bearing cups. To accomplish this, the central body portion of the cross can have an internal cavity formed therein that communicates with respective lubricant passageways that are formed through each of the trunnions. A lubricant fitting is provided on the central body portion of the cross to allow lubricant to be injected therethrough under pressure into the internal cavity. During this injection, the lubricant flows through the lubrication fitting into the cavity, radially outwardly from the cavity through each of the lubricant passageways, laterally around the ends of each of the trunnions, and radially inwardly into the regions of the bearings. A seal and dust guard assembly may be provided about the open end of each of the bearing cups to retain the lubricant in the regions of the bearings and to prevent the entry of dirt, water, and other contaminants therein.

Although this structure has been effective, it is a static lubrication system, and no mechanism is provided for positively causing the lubricant to flow through into the regions of the bearings after the initial injection. In many instances, this results in the need for periodic re-lubrication of the cross, even through a quantity of the lubricant may still be present within cavity and some or all of the lubricant passageways. Accordingly, it would be desirable to provide an improved structure for a cross for use in a universal joint that includes a lubrication system for positively causing lubricant to flow through from the cavity through the lubricant passageways and into the regions of the bearings.

SUMMARY OF THE INVENTION

This invention relates to an improved structure for a cross for use in a universal joint that includes a lubrication system for positively causing lubricant to flow from a central cavity through a lubrication passageway formed in a trunnion of the cross and into the region of the bearings contained within a bearing cup mounted on the trunnion. The lubrication system includes a pump that is disposed in the lubrication passageway formed in the trunnion of the cross. In a first embodiment, the pump is embodied as a reciprocating piston pump, including a hollow cylindrical housing having a piston slidably supported therein. When the cross is rotated during use, the piston is moved radially outwardly relative to the housing, thereby injecting a quantity of lubricant into the region of the bearings. When the cross is ceased to be rotated, the piston is moved radially outwardly relative to the housing under the urging of a spring. In a second embodiment, the pump is embodied as a rotatable auger pump. When the bearing cup rotates back and forth relative to the trunnion during use, the auger is rotated relative to the housing, thereby causing lubricant to be pumped into the region of the bearings.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
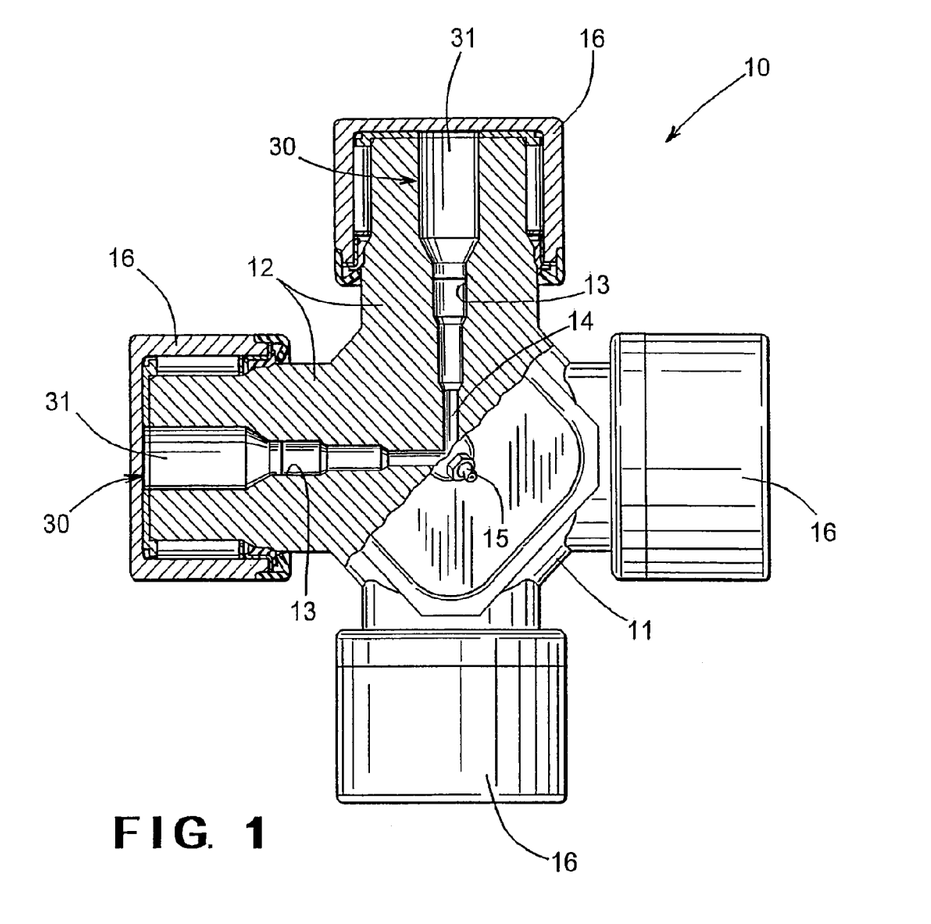
FIG. 1 is an elevational view, partially in cross section, of a cross for a universal joint including a lubrication system in accordance with this invention.

Referring now to the drawings, there is illustrated in FIG. 1 a cross, indicated generally at 10, that is generally conventional in the art. The cross 10 is adapted to form a portion of a conventional universal joint (not shown), such as is commonly used in vehicular and other types of drive train systems. However, the scope of this invention is not intended to be limited for use with vehicular drive train systems or in drive train systems in general. On the contrary, as will become apparent below, this invention may be used in any desired environment for the purposes described below.

The illustrated cross 10 includes a central body portion 11 having a plurality of trunnions 12 extending outwardly therefrom. In the illustrated embodiment, four of such trunnions 12 are formed integrally with the body portion 11 of the cross 10. The trunnions 12 are disposed at right angles relative to one another and are oriented so as to lie in a single plane. Each of the illustrated trunnions 12 is generally hollow and cylindrical in shape and extends outwardly from the central body portion 11 along respective longitudinal axes, although such is not required. Each of the illustrated trunnions 12 has a lubricant passageway 13 formed therein that extends radially outwardly from a central cavity 14 formed in the central body portion 11. The lubricant passageways 13 extend radially outwardly from the central cavity 14 through the respective trunnions 12. A lubrication fitting 15 is mounted on the central body portion 11 of the cross 10 and communicates with the central cavity 14. The lubrication fitting 15 can, for example, be a conventional check valve that allows lubricant (not shown) to be injected therethrough under pressure into the central cavity 14, while preventing such lubricant from leaking outwardly therefrom. A bearing cup, indicated generally at 16, is rotatably supported on the end of each of the trunnions 12. The structures by which the bearing cups 16 are rotatably supported on the ends of the trunnions 12 are described in detail below.

Figure 2:
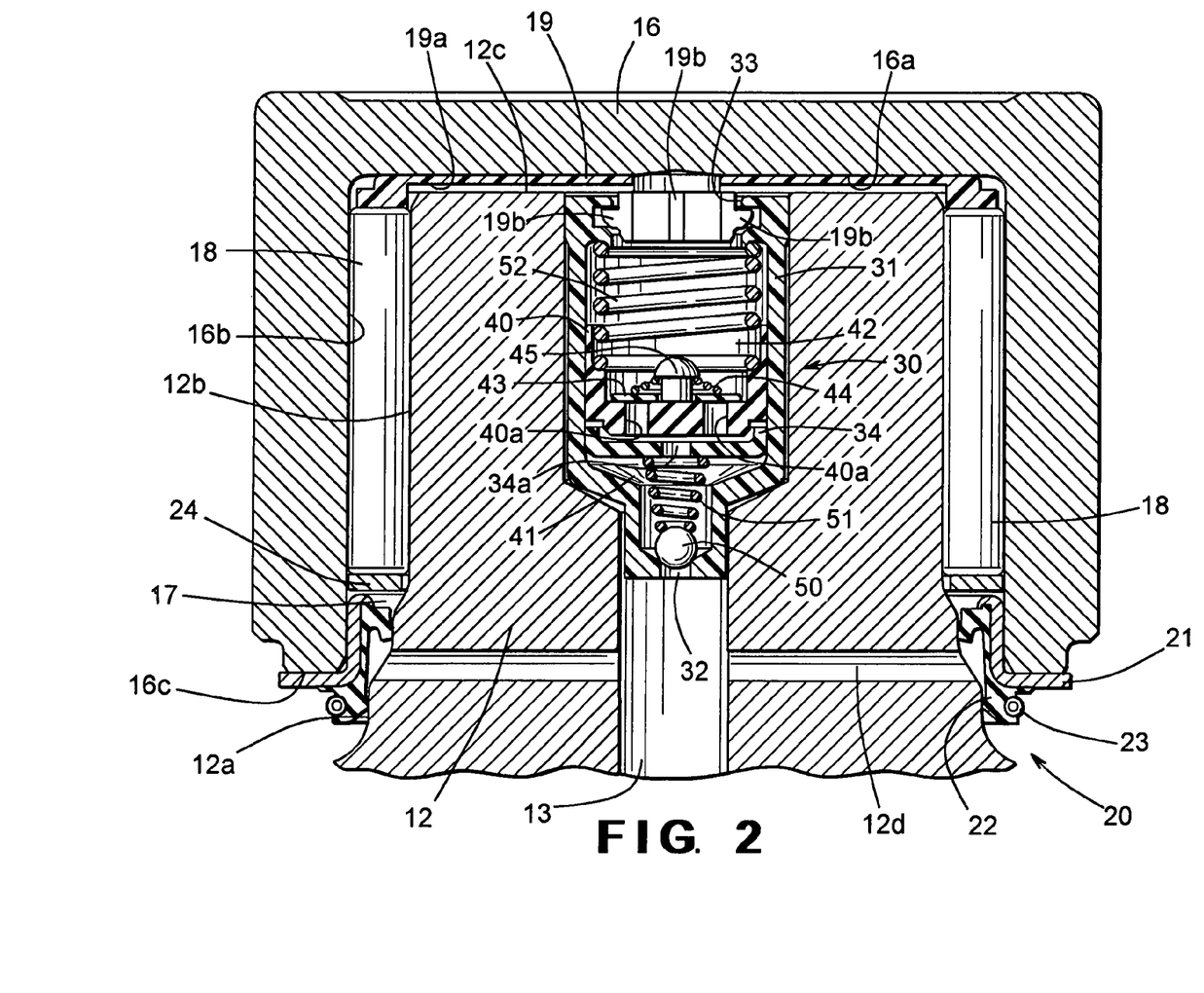
FIG. 2 is an enlarged sectional elevational view of one of the trunnions of the cross illustrated in FIG. 1 showing a first embodiment of a lubrication system in accordance with this invention in a first operating position.

The structure of one of the trunnions 12 of the cross 10 is illustrated in more detail in FIG. 2. As shown therein, the illustrated trunnion 12 includes a generally cylindrical sealing surface 12a that extends radially outwardly from the body portion 11 of the cross 10 and a generally cylindrical bearing surface 12b that extends radially outwardly from the cylindrical sealing surface 12a. The bearing surface 12b of the trunnion 12 terminates at an axially outer end surface 12cThe lubricant passageway 13 extends through the trunnion 12 to the outer end surface 12c thereof. The illustrated trunnion 12 also has one or more lateral passageway formed therein for a purpose that will be explained below.

The bearing cup 16 is conventional in the art and is generally hollow and cylindrical in shape, including a closed end 16a, an inner cylindrical bearing surface 16band an opened end 16c. When mounted about the trunnion 12, the closed end 16a of the bearing cup 16 is disposed adjacent to the axially outer end surface 12c of the trunnion 12. At the same time, the inner bearing surface 16b of the bearing cup 16 is disposed concentrically about the outer bearing surface 12b of the trunnion 12. The inner diameter defined by the inner bearing surface 16b of the bearing cup 16 is somewhat larger than the outer diameter defined by the outer bearing surface 12b of the trunnion 12. Consequently, an annular region or space 17 is defined extending between the inner bearing surface 16b of the bearing cup 16 and the outer bearing surface 12b of the trunnion 12. A plurality of conventional roller bearings 18 (only two are illustrated) are disposed in the annular space 17 in a circumferential array between the inner bearing surface 16b of the bearing cup 16 and the outer bearing surface 12b of the trunnion 12. As is well known, the roller bearings 18 are provided to facilitate rotational movement of the bearing cup 16 relative to the trunnion 12 during operation.

An annular thrust washer 19 is disposed between the axially outer end surface 12c of the trunnion 12 and the closed end 16a of the bearing cup 16. The thrust washer 19 is generally conventional in the art and is provided to reduce the amount of friction between the trunnion 12 and the associated bearing cup 16 when relative rotation therebetween occurs. The thrust washer 19 can also reduce the amount of friction between the roller bearings 18 and the bearing cup 16 and take up any looseness between the bearing cup 16 and the trunnion 12. A plurality of grooves 19a is formed in the radially inwardly facing surface of the thrust washer 19. The grooves 19a are also conventional in the art and provide fluid communication between the lubricant passageway 13 within the trunnion 12 and the annular space 17 containing the bearings 18. As a result, when lubricant is injected into the central cavity 14 of the central body portion 12 of the cross 10, such lubricant flows radially outwardly through the lubricant passageway 13, laterally across the outer end surface 12c of the trunnion 12 through the grooves 19a provided in the thrust washer 19, and radially inwardly into the annular space 17 containing the bearings 18. Additionally, if desired, the thrust washer 19 may have one or more fingers 19b provided thereon that extend partially within the lubricant passageway 13. The purpose for such fingers 19b will be explained below.

An annular seal assembly, indicated generally at 20, is provided about the open end 16c of each of the bearing cups 16. The seal assembly 20 is conventional in the art and includes a metallic support ring 21, an elastomeric seal 22, and a garter spring 23. The illustrated support ring 21 is generally S-shaped in cross section, although such is not required. The central portion of the support ring 21 has an outer diameter that is slightly larger than an inner diameter defined by the inner bearing surface 16b of the bearing cup 16. Therefore, the support ring 21 can be pressed into the inner bearing surface 16b of the bearing cup 16 and be retained therein by friction. A retaining ring 24 may be provided between the support ring 21 and the bearings 18, although such is not required. The elastomeric seal 22 is attached to the support ring 21 by any conventional means, such as by adhesive bonding. The garter spring 23 positively urges the elastomeric seal 22 into sealing engagement with the cylindrical sealing surface 12a of the trunnion 12. The lateral passageways 12d provide fluid communication between the seal assembly 20 and the lubricant passageway 13 formed in the trunnion 12 and provide a further purpose that will be explained below.

FIG. 2 further illustrates a first embodiment of a lubrication system, indicated generally at 30, that is provided in the lubricant passageway 13 in accordance with this invention. The first embodiment of the lubrication system 30 includes a generally hollow cylindrical housing 31 defining an internal fluid chamber that extends from an intake opening 32, located at the radially innermost end thereof near the central cavity 14, to an output opening 33, located at the radially outermost end thereof adjacent to the thrust washer 19. The fingers 19b of the thrust washer 19 engage the output opening 33 of the housing 31 to retain the thrust washer 19 on the trunnion 12. Because the bearing cup 16 is retained to the thrust washer 19 by means of the bearings 18 and the seal assembly 20, the fingers 19b of the thrust washer 19 function to retain the bearing cup 16 on the trunnion 12, such as during shipment.

Preferably, the housing 31 of the lubrication system 30 is sized to be press fit within the lubricant passageway 13, although such is not required. The intake opening 32 provides fluid communication between the lubricant passageway 13 and the internal fluid chamber defined within the housing 30. Similarly, the outlet opening 33 provides fluid communication between the internal fluid chamber defined within the housing 30 and the grooves 19a formed in radially inwardly facing surface of the thrust washer 19. A reaction plate 34 is disposed within the housing 31 and is secured thereto by any conventional means. For example, the reaction plate 34 may be formed integrally with the housing 31 or may be formed as a separate piece (as illustrated) that is secured to the inner surface of the housing 31. The reaction plate 34 has a central opening 34a formed therethrough for a purpose that will be explained below.

The lubrication system 30 also includes a piston 40 that is disposed within the housing 31 for linear reciprocating movement relative thereto. The illustrated piston 40 is generally cup-shaped, having a cylindrical side wall and a circular end wall. However, the piston 40 may be formed having any other desired structure. The cylindrical side wall of the piston 40 engages the inner surface of the housing 31 in such a manner as to provide a relatively fluid-tight seal therebetween, yet allow sliding movement of the piston 40 relative to the housing 31. The piston 40 divides the internal fluid chamber defined within the housing 30 into a radially innermost inner chamber 41 (extending radially inwardly from the end wall of the piston 40 to the intake opening 32) and a radially outermost outer chamber 42 (extending radially outwardly from the end wall of the piston 40 to the outlet opening 33).

Figure 3:
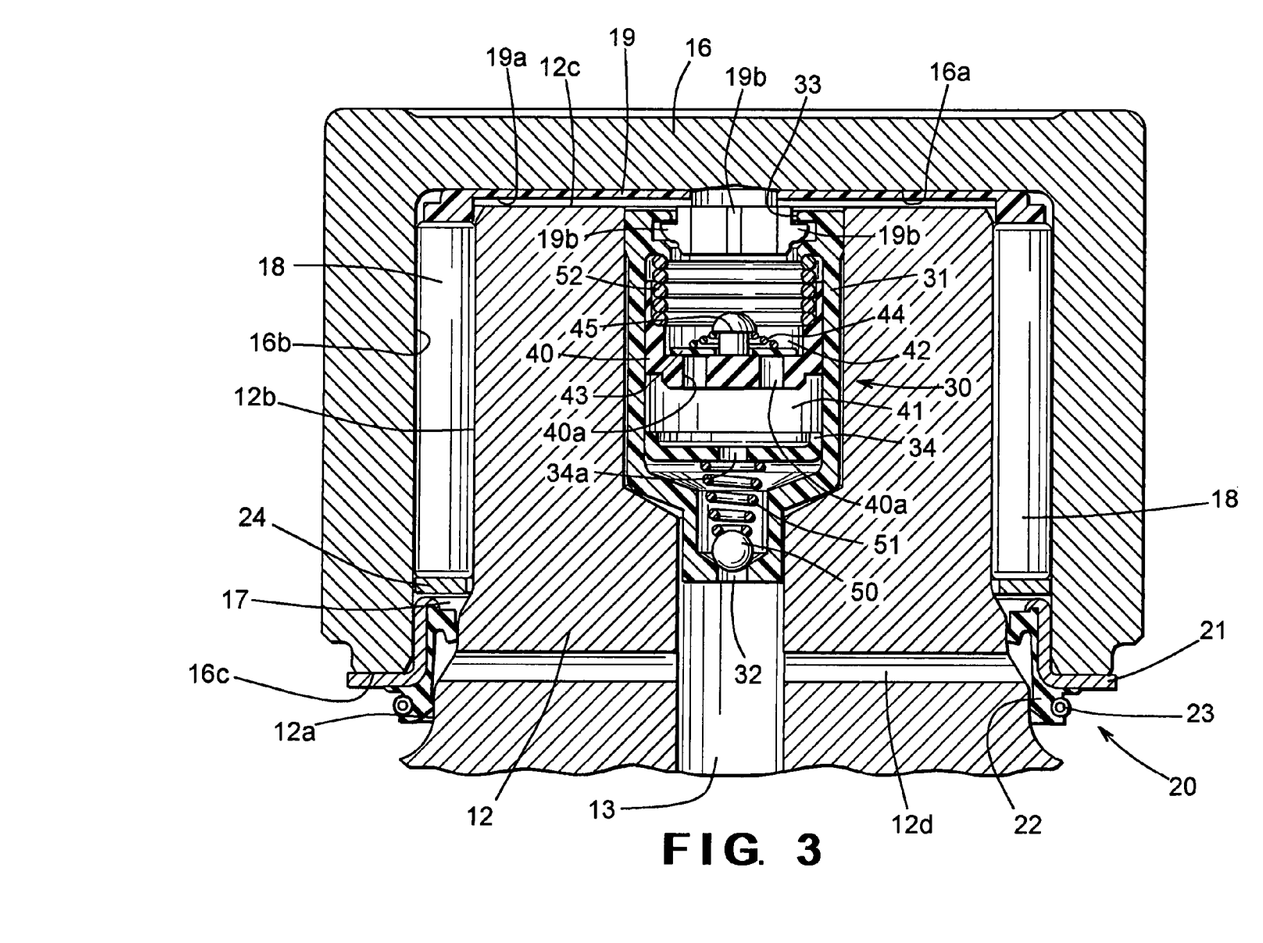
FIG. 3 is an enlarged sectional elevational view similar to FIG. 2 showing the first embodiment of the lubrication system in a second operating position.

The piston 40 includes a first check valve for permitting the one-way flow of lubricant from the inner chamber 41 of the housing 31 into the outer chamber 42 thereof. In the illustrated embodiment, the first check valve includes one or more openings 40a (two are shown in the illustrated embodiment) that are formed through the end wall of the piston 40. The first check valve also includes a sealing plate 43 that is urged into engagement with the end wall of the piston 40 by a coiled spring 44. As shown in FIGS. 2 and 3, the spring 44 reacts between a post 45 or other similar structure and the sealing plate 43 so as to urge the sealing plate 43 into sealing engagement with the end wall of the piston 40. The sealing plate 43 is sized to extend over all of the openings 40a that are formed through the end wall of the piston 40. As a result, the flow of lubricant from the inner chamber 41 of the housing 31 into the outer chamber 42 thereof is permitted, while the flow of lubricant from the outer chamber 42 of the housing 31 into the inner chamber 41 thereof is prevented. The first check valve may be embodied as any other desired structure for accomplishing this function. The purpose for the first check valve will be explained below.

The lubrication system 30 also includes a second check valve for permitting the one-way flow of lubricant from the lubricant passageway 13 into the inner chamber 41 of the housing 31. In the illustrated embodiment, the second check valve includes a ball 50 and a coiled spring 51. As shown in FIGS. 2 and 3, the spring 51 reacts between the reaction plate 34 and the ball 50 so as to urge the ball 50 into sealing engagement with the intake opening 32. As a result, the flow of lubricant from the lubricant passageway 13 into the inner chamber 41 of the housing 31 is permitted, while the flow of lubricant from the inner chamber 41 of the housing 31 into the lubricant passageway 13 is prevented. The second check valve may be embodied as any other desired structure for accomplishing this function. The purpose for the second check valve will also be explained below.

As mentioned above, the piston 40 is disposed within the housing 31 for linear reciprocating movement relative thereto. The piston 40 is movable between a retracted position (illustrated in FIG. 2, wherein the piston 40 is located at a radially inward position relative to the housing 31) and an extended position (illustrated in FIG. 3, wherein the piston 40 is located at a radially outward position relative to the housing 31). A spring 52 is provided within the housing 31 to urge the piston 40 from the extended position to the retracted position. To accomplish this, the illustrated spring 52 reacts between the housing 31 and the end wall of the piston 40. However, any other desired means can be provided for accomplishing this function. The purpose for the spring 52 will be explained below.

The operation of the first embodiment of the lubrication system 30 will now be described. As mentioned above, the cross 10 is adapted to form a portion of a conventional universal joint (not shown), such as is commonly used in vehicular and other types of drive train systems. Prior to operating the drive train system, it is known to preliminarily inject lubricant under pressure through the lubrication fitting 15 into the central cavity 14 of the cross 10. The pressurized lubricant flows from the central cavity radially outwardly through each of the lubricant passageways 13 and through each of the lubrication systems 30 provided therein. This occurs because the second check valve (including the ball 50 and the coiled spring 51) permits the one-way flow of the pressurized lubricant from the lubricant passageway 13 into the inner chamber 41 of the housing 31. Similarly, the first check valve (including the plate 43 and the spring 44) permits the one-way flow of the pressurized lubricant from the inner chamber 41 of the housing 31 into the outer chamber 42 thereof. Thus, the pressurized lubricant flows freely through each of the lubrication systems 30. Thereafter, the pressurized lubricant flows laterally around the ends of each of the trunnions 12 (by means of the grooves 19a formed in the inner surface of the thrust washer 19) and radially inwardly into the annular regions or spaces 17 containing the bearings 18, as described above.

When the drive train system is at rest, the cross 10 of the universal joint is not rotated. As a result, the piston 40 is maintained in the retracted position relative to the housing 31 under the urging of the spring 52, as shown in FIG. 2. Similarly, the sealing plate 43 is urged into sealing engagement with the end wall of the piston 40 under the urging of the spring 44, and the ball 50 is urged into sealing engagement with the intake opening 32 of the housing 31 under the urging of the spring 51.

When the drive train system is subsequently operated, the cross 10 of the universal joint is rotated at a relatively high speed. Such rotation causes the piston 40 to be moved radially outwardly relative to the housing 31 from the retracted position illustrated in FIG. 2 to the extended position illustrated in FIG. 3, against the urging of the spring 52. This radially outwardly movement of the piston 40 ejects the lubricant contained within the outer chamber 42 of the housing 31 laterally around the ends of each of the trunnions 12, through the grooves 19b formed in the thrust washer 19, and radially inwardly into the annular regions or spaces 17 containing the bearings 18, as described above. This occurs because the first check valve (including the sealing plate 43 and the spring 44) prevents the flow of the pressurized lubricant through the end wall of the piston 40 from the outer chamber 42 of the housing 31 to the inner chamber 41 thereof.

At the same time, this radially outwardly movement of the piston 40 also causes lubricant contained within the lubricant passageway 13 to be drawn into inner chamber 41 of the housing 31. This occurs because the radially outward movement of the piston 40 lowers the pressure in the inner chamber 41 of the housing 31 to a level that is less than the pressure in the lubricant passageway 13. As discussed above, the second check valve (including the ball 50 and the coiled spring 51) permits the one-way flow of lubricant from the lubricant passageway 13 into the inner chamber 41 of the housing 31. The central opening 34a formed through the reaction plate 34 allows such lubricant to flow freely therethrough.

When the operation of the drive train system is subsequently discontinued (or slowed to a relative slow rotational speed), the piston 40 is returned to the retracted position relative to the housing 31 under the urging of the spring 52, as shown in FIG. 2. As a result, the lubricant contained in the inner chamber 41 of the housing 31 flows through the end wall of the piston 40 into the outer chamber 42. This occurs because (1) the first check valve (including the sealing plate 43 and the spring 44) permits the one-way flow of the lubricant through the end wall of the piston 40 from the inner chamber 41 of the housing 31 into the outer chamber 42 thereof, and (2) the second check valve (including the ball 50 and the coiled spring 51) prevents the flow of lubricant from the inner chamber 41 of the housing 31 into the lubricant passageway 13.

Thus, it can be seen that the lubrication system 30 of this invention functions as a reciprocating piston type of pump that injects a quantity of lubricant from the lubricant passageway 13 to the annular regions or spaces 17 containing the bearings 18 each time that the cross 10 is rotated at a sufficiently high speed as to cause the piston 40 to move radially outwardly against the urging of the spring 52. The lubricant flows from the annular regions or spaces 17 containing the bearings 18 through the annular seal assembly 20 and the lateral passageways 12d and back into the lubricant passageways 13, thus providing a closed circuit for the continuous recirculation of lubricant.

Figure 4:
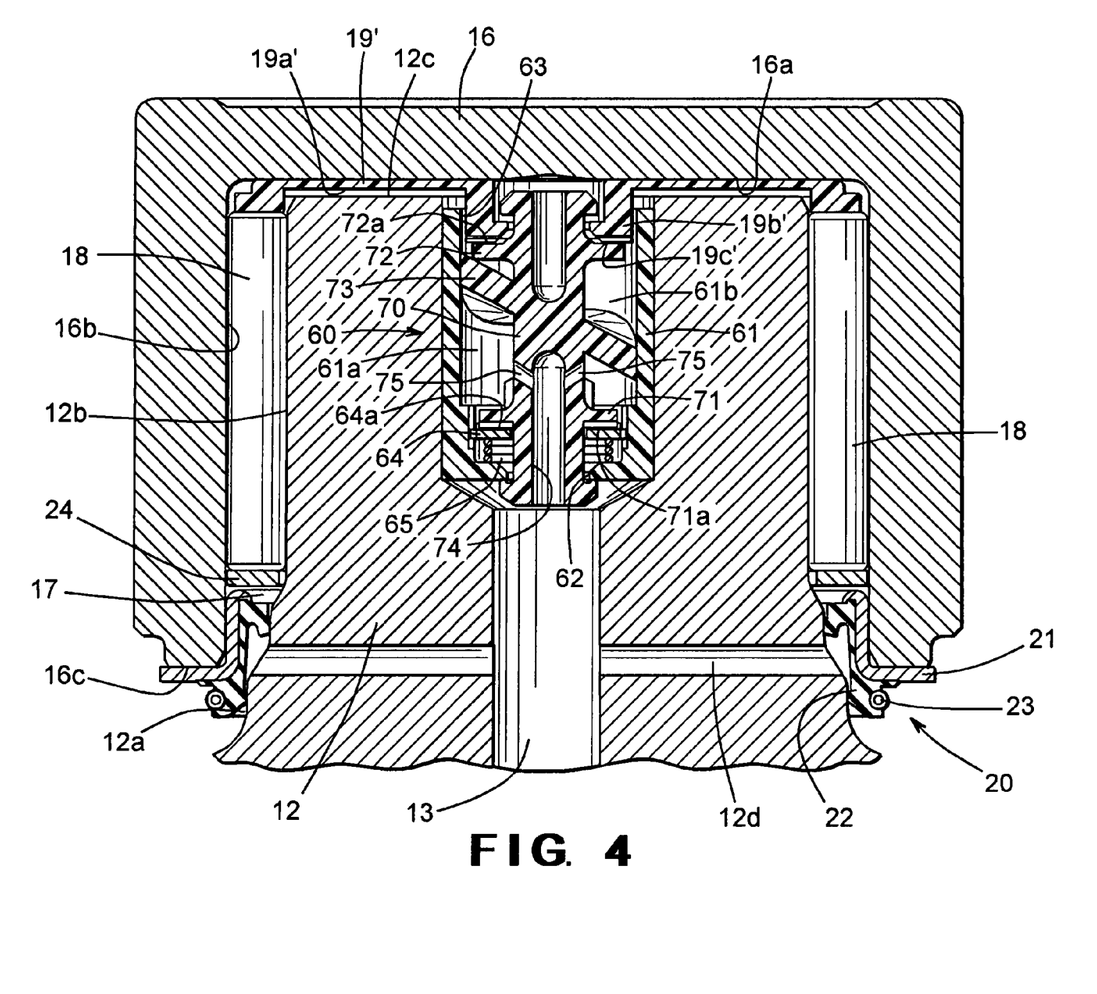
FIG. 4 is an enlarged sectional elevational view similar to FIG. 2 showing a second embodiment of a lubrication system in accordance with this invention.

FIG. 4 illustrates a second embodiment of a lubrication system, indicated generally at 60, that can be provided in the lubricant passageway 13 of the cross 10 in accordance with this invention. The second embodiment of the lubrication system 60 includes a generally hollow cylindrical housing 61 defining an internal fluid chamber that extends from an intake opening 62, located at the radially innermost end thereof near the central cavity 14, to an output opening 63, located at the radially outermost end thereof adjacent to the thrust washer 19. The intake opening 62 provides fluid communication between the lubricant passageway 13 and the internal fluid chamber defined within the housing 60.

Similarly, the outlet opening 63 provides fluid communication between the internal fluid chamber defined within the housing 60 and grooves 19a' formed in radially inwardly facing surface of a modified thrust washer 19'.

In this embodiment of the invention, the modified thrust washer 19' is provided with a central projection 19b' that extends partially within the housing 61 adjacent to the output opening 63 thereof. The projection 19b' has a circumferential array of ramp-shaped projections 19c' provided on a radially inwardly facing surface thereof. The purpose for these inwardly facing ramp-shaped projections 19c' will be explained below.

A reaction plate 64 is provided within the internal fluid chamber defined within the housing 61 adjacent to the intake opening 62. The reaction plate 64 is preferably secured to the housing 61 in such a manner as to prevent relative rotational movement therebetween, while permitting relative axial movement to occur. To accomplish this, the outer circumferential surface of the reaction plate 64 and the inner circumferential surface of the housing 61 can be formed having cooperating splines. However, the reaction plate 64 can be secured to the housing 61 in any desired manner so as to prevent relative rotational movement therebetween. The reaction plate 64 has a circumferential array of ramp-shaped projections 64a provided on a radially outwardly facing surface thereof. The purpose for these outwardly facing ramp-shaped projections 64a will be explained below. A spring 65 reacts between the housing 61 and the reaction plate 64 so as to urge the reaction plate 64 radially outwardly. The spring 65 can be embodied as any structure for accomplishing this function. The purpose for this spring 65 will also be explained below.

An auger 70 is supported for rotation within the internal fluid chamber of the housing 61. The auger 70 includes a generally cylindrical body having a radially innermost flange 71, a radially outermost flange 72, and a helical auger blade 73 provided thereon. In the illustrated embodiment, the radially innermost flange 71, the radially outermost flange 72, and the helical auger blade 73 are all formed integrally with the body of the auger 70. However, the radially innermost flange 71, the radially outermost flange 72, and the helical auger blade 73 may be formed from separate pieces if desired. In the illustrated embodiment, the helical auger blade 73 is located radially between the radially innermost flange 71 and the radially outermost flange 72, although such is not required. The helical auger blade 73 divides the internal fluid chamber of the housing 61 into a radially innermost chamber 61a and a radially outermost chamber 61b. In this embodiment of the invention, a central passageway 74 is formed through the auger 70 that communicates with the lubricant passageway 13. One or more lateral passageways 75 are also formed through the auger 70 that provide communication between the central passageway 74 and the radially innermost chamber 61a of the housing 61. The purpose for these passageways 74 and 75 will be explained below.

The radially innermost flange 71 is disposed adjacent to the reaction plate 64. The radially innermost flange 71 has a circumferential array of ramp-shaped projections 71a provided on a radially inwardly facing surface thereof. The purpose for these inwardly facing ramp-shaped projections 71a will be explained below. Similarly, the radially outermost flange 72 is disposed adjacent to the projection 19b' of the thrust plate 19'. The radially outermost flange 72 has a circumferential array of ramp-shaped projections 72a provided on a radially outwardly facing surface thereof. The purpose for these outwardly facing ramp-shaped projections 72*a* will also be explained below.

Figure 5:
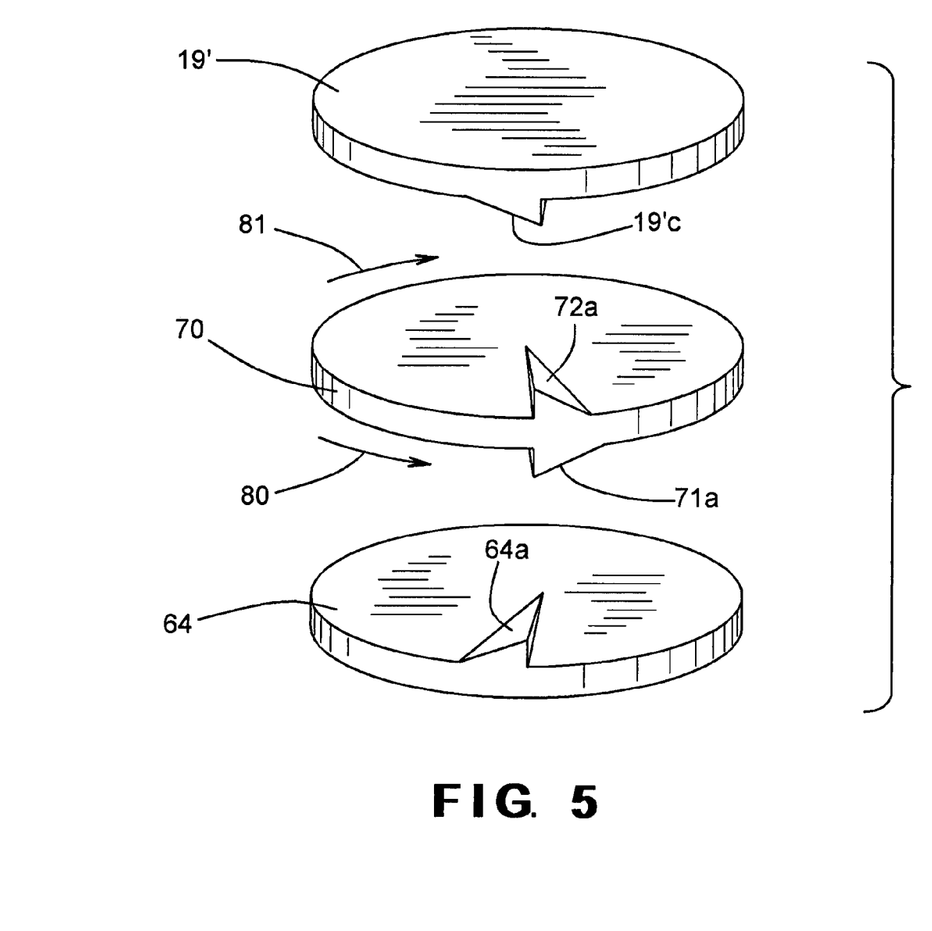
FIG. 5 is a schematic perspective view of portions of the second embodiment of the lubrication system illustrated in FIG. 4.

FIG. 5 schematically illustrates the relationship between the thrust washer 19', the auger 70, and the reaction plate 64. As shown therein, the inwardly facing ramp-shaped projections 71*a* provided on the radially innermost flange 71 of the auger 70 cooperate with the outwardly facing ramp-shaped projections 64*a* provided on the reaction plate 64 to permit the auger 70 to rotate relative to the reaction plate 64 (and, therefore, the housing 61) in a first rotational direction, which is indicated by a first arrow 80 in FIG. 5. At the same time, the inwardly facing ramp-shaped projections 71*a* provided on the radially innermost flange 71 of the auger 70 cooperate with the outwardly facing ramp-shaped projections 64*a* provided on the reaction plate 64 to prevent the auger 70 from rotating relative to the reaction plate 64 (and, therefore, the housing 61) in a second rotational direction, which is indicated by a second arrow 81 in FIG. 5, that is opposite to the first rotational direction 80. Thus, the auger 70 can rotate in the first rotational direction 80, but cannot rotate in the second rotational direction 81.

As also shown in FIG. 5, the inwardly facing ramp-shaped projections 19*c*' provided on the projection 19*b*' of the thrust plate 19' cooperate with the outwardly facing ramp-shaped projections 72*a* provided on the outwardly facing surface of the radially outermost flange 72 of the auger 70 to permit the thrust plate 19' to positively rotatably drive the auger 70 in the first rotational direction 80. However, the inwardly facing ramp-shaped projections 19*c*' provided on the projection 19*b*' of the thrust plate 19' do not cooperate with the outwardly facing ramp-shaped projections 72*a* provided on the outwardly facing surface of the radially outermost flange 72 of the auger 70 to permit the thrust plate 19' to positively rotatably drive the auger 70 in the second rotational direction 81. The spring 65 urges the thrust washer 19', the auger 70, and the reaction plate 64 toward one another to as to maintain the engagement of the various ramp-shaped projections discussed above.

The operation of the second embodiment of the lubrication system 60 will now be described. As discussed above, prior to operating the drive train system, it is known to preliminarily inject lubricant under pressure through the lubrication fitting 15 into the central cavity 14 of the cross 10. Thus, lubricant is injected through the passageways 74 and 75 formed through the auger 70 into the radially innermost chamber 61*a* of the housing 61. Thereafter, during operation of the drive train system, the cross 10 is rotated. As a result, lubricant is continued to be urged to flow from the lubrication passageway 13 through the passageways 74 and 75 formed through the auger 70 into the radially innermost chamber 61*a* of the housing 61.

During operation of the drive train system, the bearing cup 16 rotates back and forth relative to the trunnion 12 (provided that there is a non-zero angle of articulation between the two shafts that are connected together by the universal joint in which the cross 10 is used). The thrust washer 19' also rotates with the bearing cup 16 back and forth relative to the trunnion 12. When the thrust washer 19' is rotated in the first rotational direction 80 relative to the trunnion 12, the inwardly facing ramp-shaped projections 19*c*' provided on the projection 19*b*' of the thrust plate 19' cooperate with the outwardly facing ramp-shaped projections 72*a* provided on the outwardly facing surface of the radially outermost flange 72 of the auger 70 to positively rotatably drive the auger 70 in the first rotational direction 80. However, when the thrust washer 19' is rotated in the second rotational direction 81 relative to the trunnion 12, the inwardly facing ramp-shaped projections 71*a* provided on the radially innermost flange 71 of the auger 70 cooperate with the outwardly facing ramp-shaped projections 64*a* provided on the reaction plate 64 to prevent the auger 70 from rotating in the second rotational direction 81.

Thus, during operation of the drive train system, the auger 70 is continuously rotated in the first rotational direction 80 relative to the housing 61. Such rotational movement of the auger 70 relative to the housing 61 causes lubricant contained in the radially innermost chamber 61*a* to be pumped through to the radially outermost chamber 61*b* and out through the grooves 19*a*' formed in the thrust washer 19' to the annular regions or spaces 17 containing the bearings 18. Thus, it can be seen that the lubrication system 60 of this invention functions as an auger type of pump that injects a quantity of lubricant from the lubricant passageway 13 to the annular regions or spaces 17 containing the bearings 18 whenever the drive train system is operated (provided, again, that there is a non-zero angle of articulation between the two shafts that are connected together by the universal joint in which the cross 10 is used). The lubricant flows from the annular regions or spaces 17 containing the bearings 18 through the annular seal assembly 20 and the passageways 12*d* and back into the lubricant passageways 13, thus providing a closed circuit for the continuous recirculation of lubricant.

Figure 6:
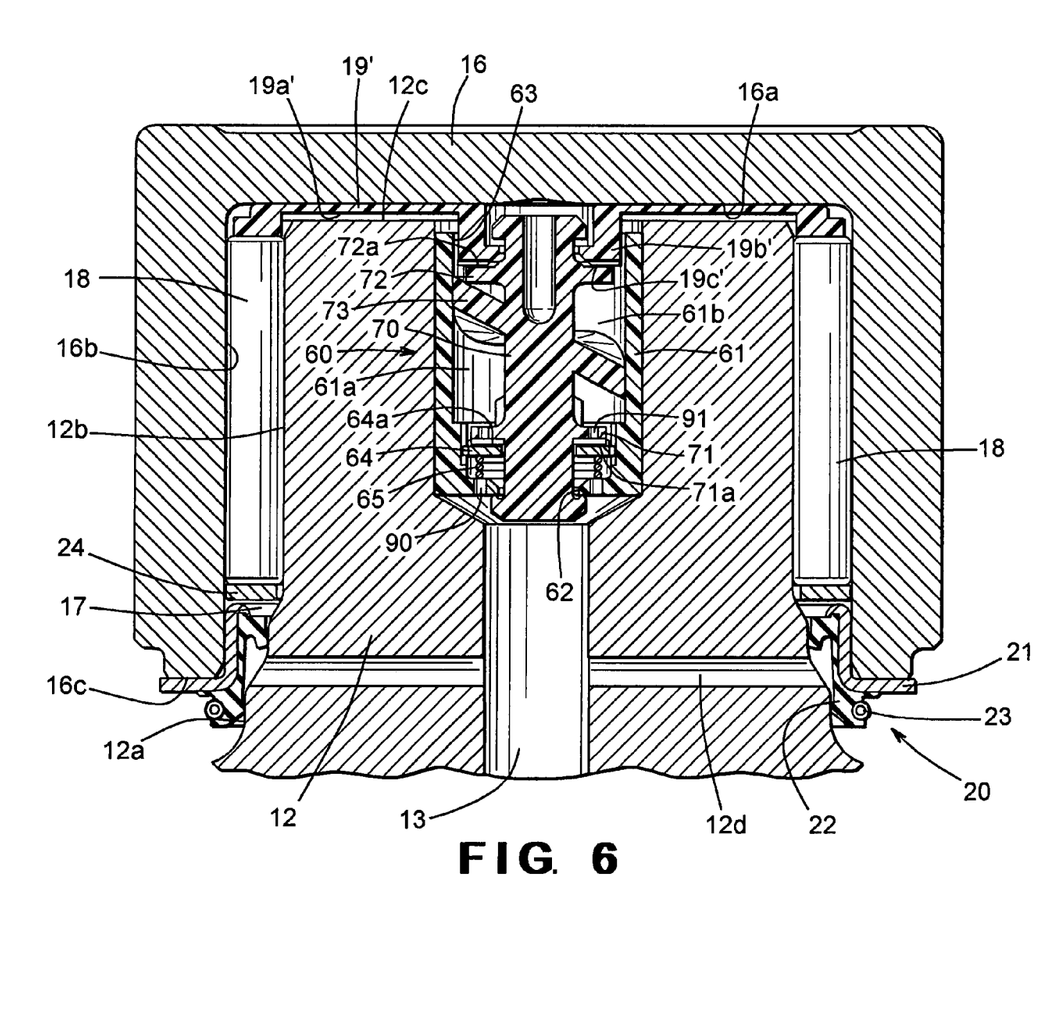
FIG. 6 is an enlarged sectional elevational view similar to FIG. 5 showing a third embodiment of a lubrication system in accordance with this invention.

FIG. 6 illustrates a third embodiment of a lubrication system, indicated generally at 60', that can be provided in the lubricant passageway 13 of the cross 10 in accordance with this invention. The structure and operation of the third embodiment of the lubrication system 60' is generally similar to the second embodiment of the lubrication system 60 described above, and like reference numbers are used to indicate similar components. In the third embodiment of the lubrication system 60', the passageways 74 and 75 formed in the auger 70 have been replaced by one or more passageways 90 that are formed through the bottom of the housing 61 and by one or more passageways 91 that are formed through the radially innermost flange 71. The passageways 90 and 91 provide communication from the lubrication passageway 13 into the radially innermost chamber 61*a* of the housing 61. The operation of the third embodiment of the lubrication system 60' is otherwise the same as the second embodiment of the lubrication system 60 discussed above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A cross for a universal joint comprising:
   a body portion having a cavity formed therein that is adapted to receive a quantity of a material;
   at least one trunnion extending outwardly from said body portion to an end surface, said trunnion having a first passageway that extends from said cavity to said end surface and a second passageway that extends from said first passageway to an outer surface of said trunnion; and
   a pump disposed within said first passageway that is adapted to pump material from said cavity to said end surface.

2. The cross defined in claim 1 wherein said pump includes a piston that reciprocates within said first passageway to pump the material from said cavity through said first passageway to said end surface.

3. The cross defined in claim 2 wherein said piston is responsive to rotation of said body portion for moving in a first direction within said first passageway.

4. The cross defined in claim 3 further including a spring for urging said piston to move in a second direction opposite to said first direction within said first passageway.

5. The cross defined in claim 1 wherein said pump includes a check valve for permitting the one-way flow of material from said cavity through said first passageway to said end surface.

6. The cross defined in claim 1 wherein said pump includes a housing that is disposed within said first passageway and a piston that is slidably disposed within said housing for reciprocating movement between extended and retracted positions.

7. The cross defined in claim 6 wherein said piston is responsive to rotation of said body portion for moving from said retracted position to said extended position.

8. The cross defined in claim 7 further including a spring for urging said piston to move from said extended position to said retracted position.

9. The cross defined in claim 6 wherein said housing includes an intake opening that communicates with said first passageway and an output opening that communicates with said end surface, and wherein said housing includes a check valve for permitting the one-way flow of material from said first passageway to said output opening.

10. The cross defined in claim 6 wherein said piston divides said housing into a first chamber that communicates with said first passageway and a second chamber that communicates with said end surface, and wherein said piston includes a check valve for permitting the one-way flow of material from said first chamber to said second chamber.

11. The cross defined in claim 6 wherein said housing includes an intake opening that communicates with said first passageway and an output opening that communicates with said end surface, and wherein said piston divides said housing into a first chamber that communicates with said intake opening and a second chamber that communicates with said output opening, said housing including a first check valve for permitting the one-way flow of material from said first passageway to said first chamber, said piston including a second check valve for permitting the one-way flow of material from said first chamber to said second chamber.

12. The cross defined in claim 1 further including a bearing cup that is rotatably supported on said trunnion, and wherein said pump includes a structure for retaining said bearing cup on said trunnion.

13. The cross defined in claim 1 wherein said pump includes an auger that rotates within said first passageway to pump the material from said cavity through said first passageway to said end surface.

14. The cross defined in claim 13 further including a bearing cup that is rotatably supported on said trunnion, and wherein said auger is responsive to rotation of said bearing cup relative to said trunnion for rotating in a first direction within said first passageway.

15. The cross defined in claim 14 further including a mechanism for preventing said auger from rotating within said first passageway in a second direction opposite to said first direction.

16. The cross defined in claim 1 wherein said second passageway extends laterally relative to said trunnion from said first passageway to said outer surface of said trunnion.

17. A cross for a universal joint comprising:
a body portion having a cavity formed therein that is adapted to receive a quantity of a material;
at least one trunnion extending outwardly from said body portion to an end surface, said trunnion having a passageway that extends from said cavity to said end surface; and
a pump disposed within said passageway that is adapted to pump material from said passageway to said end surface, said pump including a housing that is disposed within said passageway, a piston that is slidably disposed within said housing for reciprocating movement between extended and retracted positions, and a spring that reacts between said housing and said piston to urge said piston toward said retracted position.

18. A cross for a universal joint comprising:
a body portion having a cavity formed therein that is adapted to receive a quantity of a material;
at least one trunnion extending outwardly from said body portion to an end surface, said trunnion having a passageway that extends from said cavity to said end surface;
a bearing cup rotatably supported on said trunnion; and
a pump disposed within said passageway that is adapted to pump material from said passageway to said end surface, said pump including a structure for retaining said bearing cup on said trunnion.

* * * * *